(12) United States Patent
Park

(10) Patent No.: US 12,337,833 B2
(45) Date of Patent: Jun. 24, 2025

(54) METHOD AND APPARATUS FOR AVOIDING COLLISION BASED ON OCCUPANT POSITION

(71) Applicant: HYUNDAI MOBIS CO., LTD., Seoul (KR)

(72) Inventor: Ge O Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 290 days.

(21) Appl. No.: 18/080,222

(22) Filed: Dec. 13, 2022

(65) Prior Publication Data

US 2023/0278547 A1    Sep. 7, 2023

(30) Foreign Application Priority Data

Mar. 3, 2022    (KR) .................. 10-2022-0027553

(51) Int. Cl.
| | |
|---|---|
| *B60W 30/09* | (2012.01) |
| *B60W 30/095* | (2012.01) |
| *B60W 40/08* | (2012.01) |
| *B60W 50/00* | (2006.01) |
| *B60W 60/00* | (2020.01) |

(52) U.S. Cl.
CPC ........ *B60W 30/09* (2013.01); *B60W 30/0956* (2013.01); *B60W 40/08* (2013.01); *B60W 50/00* (2013.01); *B60W 60/0015* (2020.02); *B60W 2040/0881* (2013.01); *B60W 2050/0083* (2013.01); *B60W 2540/049* (2020.02); *B60W 2540/227* (2020.02); *B60W 2554/80* (2020.02)

(58) Field of Classification Search
CPC .. B60W 30/09; B60W 30/0956; B60W 40/08; B60W 50/00; B60W 60/0015; B60W 2040/0881; B60W 2050/0083; B60W 2540/049; B60W 2540/227; B60W 2554/80; B60W 30/0953; B60W 30/08; B60W 50/14; B60W 60/0016; B60W 2050/0005; B60W 2050/143; G06F 9/06
USPC ........................................... 701/301
See application file for complete search history.

(56) References Cited

U.S. PATENT DOCUMENTS

| | | | |
|---|---|---|---|
| 11,161,500 B1 * | 11/2021 | Kavadia ............... | G05D 1/0088 |
| 2018/0162392 A1 * | 6/2018 | Takaki .................. | B60W 10/18 |
| 2019/0293679 A1 * | 9/2019 | Iguchi ..................... | G01P 15/18 |

* cited by examiner

*Primary Examiner* — Tiffany P Young
*Assistant Examiner* — Ashleigh Nicole Turnbaugh
(74) *Attorney, Agent, or Firm* — NSIP Law

(57) ABSTRACT

A method of avoiding a collision based on an occupant position includes determining the occupant position based on occupant detection information, determining a collision range with an other vehicle based on occupant position information, controlling a collision avoidance sensitivity increment based on a rear-end collision range with the other vehicle, and activating a collision avoidance operation to avoid a collision with the other vehicle based on the collision avoidance sensitivity increment.

19 Claims, 8 Drawing Sheets

METHOD AND APPARATUS FOR AVOIDING COLLISION BASED ON OCCUPANT POSITION

This application claims the benefit under 35 U.S.C. § 119(a) of Korean Application No. 10-2022-0027553, filed on Mar. 3, 2022, the entire disclosure of which is hereby incorporated by reference for all purposes.

BACKGROUND

Field

The present embodiments are applicable to autonomous vehicles in all fields, and more specifically, and more particularly, to various systems for guiding an autonomous vehicle to avoid a collision with a forward vehicle.

Description of the Related Art

Society of Automotive Engineers (SAE), an American automotive engineering society, subdivides autonomous driving levels into a total of six steps, for example, from level 0 to level 5, as follows.

Level 0 (No Automation) is a step in which a driver controls and is responsible for everything in driving. The driver always drives, and a system of an autonomous vehicle performs only auxiliary functions such as emergency notification, etc. At this level, a subject of driving control is human and variable detection and driving responsibility during driving are held by the human.

Level 1 (Driver Assistance) is a step of assisting a driver through adaptive cruise control and lane keeping functions. By activating a system, a driver is assisted by maintaining a speed of an autonomous vehicle, a vehicle-to-vehicle distance, and lanes. At this level, driving control subjects are a human and a system, and both the detection of variables that occur during driving and the driving responsibility are held by the humans.

Level 2 (Partial Automation) is a step in which an autonomous vehicle and a human can control steering and acceleration/deceleration of the autonomous vehicle for a certain period of time within a specific condition. Auxiliary functions such as steering at a gentle curve and maintaining a distance from a car in front are available. However, at this level, the detection of variables during driving and the driving responsibility are held by the human, the driver should always monitor a driving situation, and the driver should intervene immediately in a situation where the system is not aware of it.

Level 3 (Conditional Automation) is the level at which a system is in charge of driving in certain sections of conditions, such as highways, and at which a driver intervenes only in case of danger. The system is in charge of driving control and variable detection during driving, and unlike Level 2, the monitoring is not required. However, if it exceeds the requirements of the system, the system requests the immediate intervention of the driver.

Level 4 (High Automation) is capable of autonomous driving on most roads. Both driving control and driving responsibility are held by a system. Driver intervention is unnecessary on most roads except for restricted situations. However, since driver intervention may be requested under certain conditions such as bad weather, a driving control device through humans is necessary for this level.

Level 5 (Full Automation) is a step of enabling a driving by an occupant only without a driver. The occupant enters only a destination and a system is responsible for driving under all conditions. At Level 5, control devices for steering, acceleration, and deceleration of an autonomous vehicle are unnecessary.

Recently, autonomous vehicles using a Smart Cruise Control (SCC) system are increasing.

The smart cruise control system is a system for controlling an autonomous vehicle to maintain a distance between vehicles by measuring a vehicle-to-vehicle distance from a preceding vehicle using a radar. For this reason, there is a need for a variable forward collision avoiding method according to a position of a vehicle occupant of a vehicle.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter In one general aspect, here is provided a method of avoiding a collision based on an occupant position in a vehicle, the method including determining the occupant position based on occupant detection information, determining a collision range with an other vehicle based on occupant position information, controlling a collision avoidance sensitivity increment based on a rear-end collision range with the other vehicle, and activating a collision avoidance operation to avoid a collision with the other vehicle based on the collision avoidance sensitivity increment.

The determining the occupant position may include receiving the occupant detection information including a user's boarding position and a number of people received from a Rear Occupant Alert (ROA) system provided in the vehicle.

The determining the occupant position may also include determining that the occupant is in a driver seat line based on detecting an occupant from at least one position of a driver seat or a rear seat of the driver seat, determining that the occupant is in a passenger seat line based on detecting the occupant from at least one position of a forward passenger seat or a passenger seat, and determining that the occupants are on all seats of the vehicle based on detecting occupants on the driver seat line and the passenger seat line.

The determining the collision range may include determining whether a first overlapping collision range between a rear area of the other vehicle and an area corresponding to the driver seat line in front of the vehicle, based on the occupant being in the driver seat line, is less than or equal to a first preset value, determining whether a second overlapping collision range between a rear area of the other vehicle and an area corresponding to the passenger seat line in the front of the vehicle, based on the passenger being in the driver seat line, is less than or equal to a second preset value, and determining whether a third overlapping collision range between the rear area of the other vehicle and an entire front area of the autonomous vehicle, based on the occupants in the driver seat line and the passenger seat line of the autonomous vehicle, is less than or equal to a third preset value.

The controlling the collision avoidance sensitivity increment may include increasing the collision avoidance sensitivity increment based on one of the first overlapping collision range, the second overlapping collision range, and the third overlapping collision range being equal to or less than the respective first preset value, second preset value, and third preset value.

The collision avoidance operation may include avoiding the collision with the other vehicle based on a value of the collision avoidance sensitivity increment.

The method may also include changing the value of the collision avoidance sensitivity increment to a preset collision avoidance sensitivity increment value based on completely avoiding the collision range according to the collision avoidance operation with the other vehicle.

The determining the collision range may also include determining whether a fourth overlapping collision range in a direction opposite to a direction having the occupant located therein is equal to or less than a fourth preset value.

The controlling the collision avoidance sensitivity increment may include maintaining the collision avoidance sensitivity increment based on a determination that the fourth overlapping collision range is less than or equal to the fourth preset value.

In another general aspect here is provided a computer-readable storage medium storing at least one program code including instructions enabling at least one processor to perform operations when executed, the operations including determining an occupant position based on occupant detection information, determining a collision range with an other vehicle based on occupant position information, controlling a collision avoidance sensitivity increment based on a vehicle rear-end collision range with the other vehicle, and activating collision avoidance operation to avoid the other vehicle based on the collision avoidance sensitivity increment.

In yet another general aspect, here is provided an apparatus for avoiding a collision based on an occupant position, the apparatus including an occupant detection unit detecting a presence or non-presence of an occupant in a vehicle, an object detection unit detecting an other vehicle, and a processor unit configured to determine the occupant position based on occupant detection information based on the presence of the occupant, determine a collision range with the other vehicle based on occupant position information, set a collision avoidance sensitivity value based on a vehicle rear-end collision range with the other vehicle, and activating a collision avoidance operation to avoid a collision with the other vehicle based on the collision avoidance sensitivity value.

The occupant detection unit may include a rear occupant alert (ROA) system and the processor unit is configured to receive the occupant detection information including a user's boarding position and a number of people determined by the ROA system.

Based on detecting an occupant from at least one position of a driver seat or a passenger seat behind the driver seat, the processor unit may be configured to determine that the occupant is in a driver seat line. Also, based on detecting the occupant from at least one position of a forward passenger seat or a rear passenger seat, the processor unit may be configured to determine that the occupant is in a passenger seat line. In addition, based on detecting occupants from the driver seat line and the passenger seat line, the processor unit may be configured to determine that the occupants are on all seats of the vehicle.

Based on the occupant being in the driver seat line, the processor unit may be configured to determine whether a first overlapping collision range between a rear area of the other vehicle and an area corresponding to the driver seat line in front of the vehicle is equal to or less than a first preset value. Also, based on the occupant being in the passenger seat line, the processor unit may be configured to determine whether a second overlapping collision range between a rear area of the other vehicle and an area corresponding to the passenger seat line in front of the vehicle of the forward passenger seat is equal to or less than a second preset value. In addition, based on the occupants being in the driver seat line and the passenger seat line of the vehicle, the processor unit may be configured to determine whether a third overlapping collision range between the rear area of the other vehicle and an entire front area of the vehicle is equal to or less than a third preset value.

Based on the one of the first overlapping collision range, the second overlapping collision range, and the third overlapping collision range being equal to or less than one of the first preset value, second preset value, and third preset value, the processor unit may be configured to increase the forward collision avoidance device sensitivity value.

The processor unit may also be configured to activate a collision avoidance control with the other vehicle based on the collision avoidance sensitivity value being increased.

The processor unit may also be configured to change the collision avoidance sensitivity value to a preset sensitivity value based on completely avoiding the collision range according to the collision avoidance operation with the other vehicle.

The processor unit may also be configured to determine whether a fourth overlapping collision range in a direction opposite to a direction having the occupant located therein is equal to or less than a fourth preset value.

The processor unit may also be configured to maintain the collision avoidance sensitivity value based on the fourth overlapping collision range being equal to or less than the fourth preset value.

In another general aspect, here is provided an autonomous vehicle that includes at least one sensor detecting an occupant of a vehicle, at least one senor detecting a surrounding object, and a collision avoidance device configured to determine an occupant position based on occupant detection information based on a presence of the occupant, determine a collision range with a forward vehicle based on occupant position information, adjust a collision avoidance sensitivity increment based on a rear-end collision range with an other vehicle, and initiating a collision avoidance operation to avoid a collision with the other vehicle based on the collision avoidance sensitivity increment.

Figure 1:
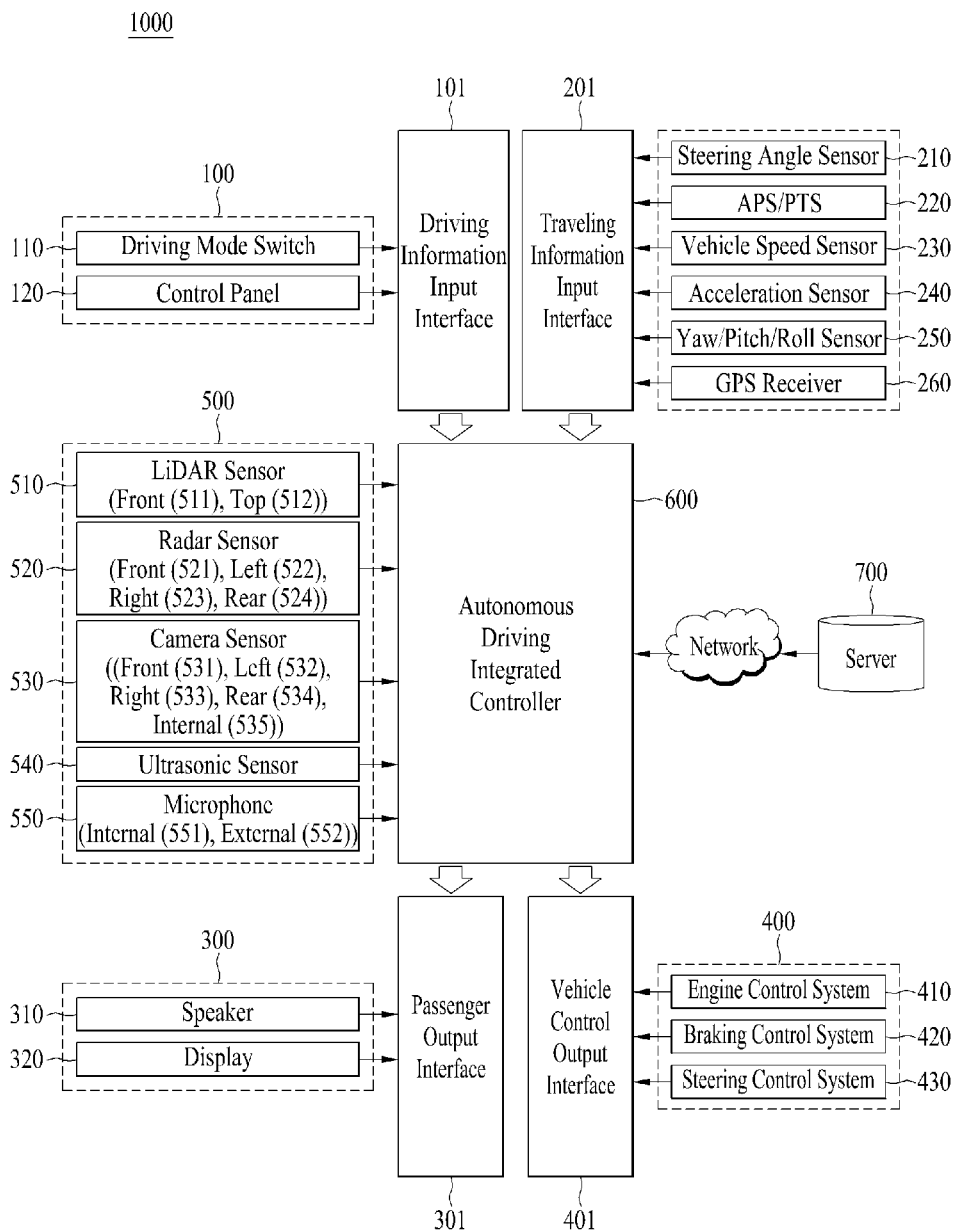
FIG. 1 is an overall block diagram of an autonomous driving control system to which an autonomous driving device according to one of embodiments of the present disclosure is applicable.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
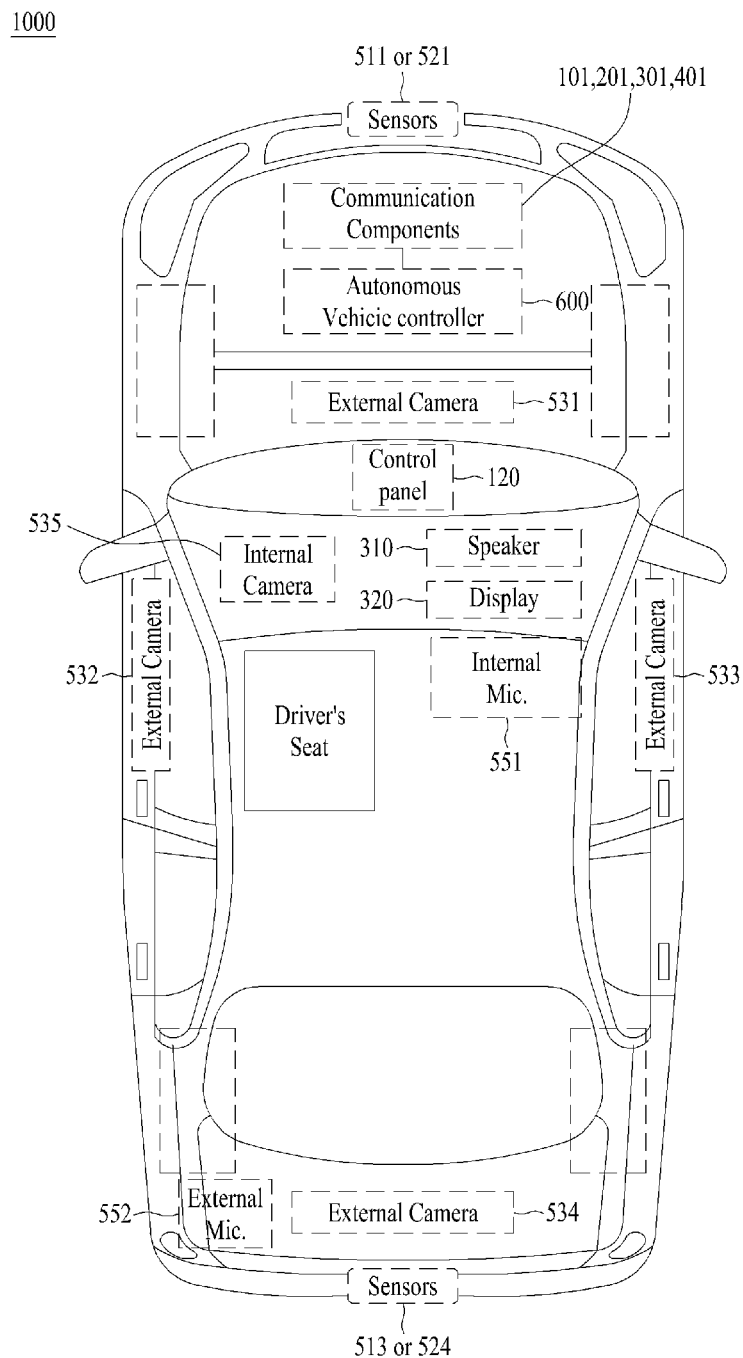
FIG. 2 is a diagram illustrating an example in which an autonomous driving device according to one of embodiments of the present disclosure is applied to an autonomous vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
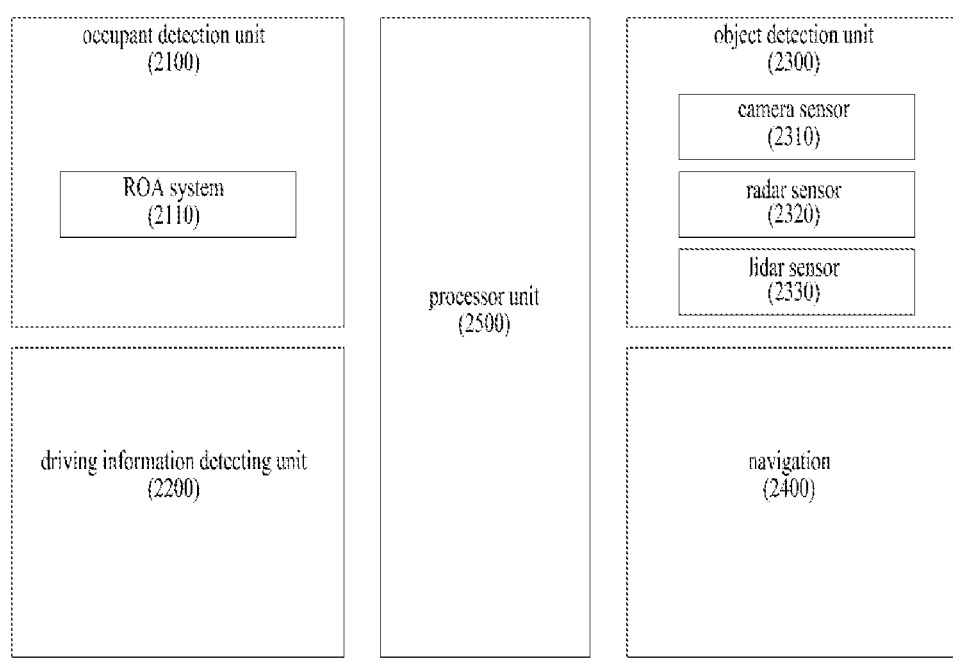
FIG. 3 is a block diagram of a forward collision avoidance device according to one of embodiments of the present disclosure.
Figure 4:
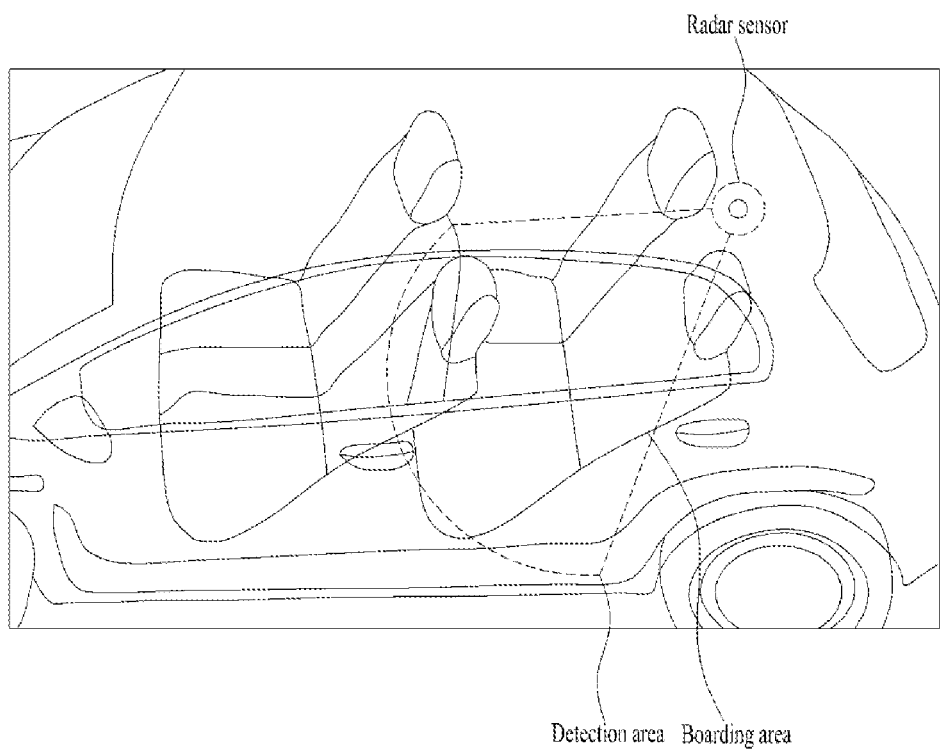
FIG. 4 is a diagram to describe an ROA system according to one embodiment of the present disclosure.

FIG. 3 is a block diagram of a forward collision avoidance device according to one of embodiments of the present disclosure. FIG. 4 is a diagram to describe an ROA system according to one embodiment of the present disclosure.

Referring to FIG. 3, a forward collision avoidance device 200 may include an occupant detection unit 2100, a driving information detection unit 2200, an object detection unit 2300, a navigation 2400, and a processor unit 200.

The occupant detection unit 2100 may detect the presence or absence of an occupant in the boarding area of occupants in an autonomous vehicle 1000. The occupant detection unit 2100 may detect an occupant in a driver seat, a passenger's seat, or a rear seat of the autonomous vehicle 1000. In this case, the occupant detection unit 2100 may detect the occupant through a Rear Occupant Alert (ROA) system 2110.

The ROA system 2110 may perform an ROA function after receiving activation from the processor unit 2500. The ROA system 2110 may transmit occupant detection information in the autonomous vehicle 1000 to the processor unit 2500 through the ROA function. The ROA system 2110 may include a radar sensor. The ROA system 2110 may detect positions and number of occupants inside the autonomous vehicle 1000 based on the radar sensor.

Referring to FIG. 4, the ROA system 2110 may radiate and receive radio waves for scanning a detection area in the autonomous vehicle 1000 through the radar sensor. The ROA system 2110 may process a received radar signal to perform a radar sensing function and determine the presence or absence of an occupant in the autonomous vehicle 1000 by the occupant detection logic.

In this case, the ROA system 2110 measures the presence of bio-signals (e.g., breathing, heart rate, heart rate, pulse, etc.) by obtaining the Doppler effect and phase change caused by the object's movement using signals received from an object detected by the occupant detection logic. When it is determined as a bio-signal, the ROA system 2110 may determine the detected object as a living object inside the autonomous vehicle 1000. Here, since the living object has its own bio-signal values depending on the species and age, it is possible to estimate not only the existence of the living object but also the species and age of the living object and the like. More specifically, if a classification algorithm using a range of an eigenvalue of the living object is applied, it is possible to distinguish a human and an animal. In addition to the bio-signal, size and movement may be used as features. Furthermore, it is possible to estimate age through changes in the eigenvalue according to age.

In addition, an internal camera sensor for photographing the inside of the autonomous vehicle 1000 may be installed in a prescribed position (e.g., a rear view mirror) inside the autonomous vehicle 1000, and the occupant detection unit 2100 may detect the positions and number of occupants by monitoring the behaviors and states of the occupants based on an image acquired through the internal camera sensor.

Referring back to FIG. 3, the driving information detection unit 2200 may include a vehicle speed sensor, a steering angle sensor, and a positioning sensor. The vehicle speed sensor senses the driving speed of the autonomous vehicle 1000, the steering angle sensor senses the steering angle formed by the adjustment of a steering wheel, and the positioning sensor may include a Global Positioning System (GPS) receiver, thereby obtaining the GPS coordinates of the autonomous vehicle 1000.

The object detection unit 2300 is for recognizing an object around the autonomous vehicle 1000 and may include at least one of a camera sensor 2310, a radar sensor, and a lidar sensor. The object detection unit 2300 may detect a forward vehicle 3000 located in front of the autonomous vehicle 1000.

The camera sensor 2310 may detect surrounding objects outside the autonomous vehicle 1000 by capturing the surroundings of the autonomous vehicle 1000, and may detect surrounding objects located within a set distance, vertical view angle, and horizontal view angle predefined according to the specifications.

The camera sensor 2310 may include a front camera sensor, a left camera sensor, a right camera sensor, and a rear camera sensor installed on the front, left, right, and rear sides of the autonomous vehicle 1000, respectively, but the installation location and number of installations are not limited to a specific embodiment. The processor unit 2500 of the autonomous vehicle 1000 may determine a location (including a distance to the corresponding object), speed, and movement direction of the object by applying a predefined image processing to an image captured by the camera sensor 2310.

The radar sensor 2320 may detect a surrounding object outside the autonomous vehicle 1000 by emitting electromagnetic waves around the autonomous vehicle 1000 and receiving a signal reflected by the corresponding object, and may detect a surrounding object located within a predefined set distance, vertical view angle, and horizontal view angle according to the specifications. The radar sensor 2320 may include a front radar sensor, a left radar sensor, a right radar sensor, and a rear radar sensor installed on the front, left, right, and rear sides of the autonomous vehicle 1000, respectively, but the installation locations and the number of installations are not limited to specific embodiments. The processor unit 2500 of the autonomous vehicle 1000 may determine a location (including a distance to the corresponding object), speed, and movement direction of the corresponding object by analyzing the power of electromagnetic waves transmitted and received through the radar sensor 2320.

The lidar sensor 2330 may detect a surrounding object outside the autonomous vehicle 1000 by transmitting a laser signal around the autonomous vehicle 1000 and receiving a signal that is reflected back by the corresponding object, and may detect a surrounding object located within a predefined set distance, vertical view angle (i.e., vertical field of view), and horizontal view angle (i.e., horizontal field of view) predefined according to the specifications. The lidar sensor 2330 may include a front lidar sensor 2330, a top lidar sensor 2330, and a rear lidar sensor 2330 installed on a front side, a top side, and a rear side of the autonomous vehicle 1000, respectively, but the installation locations and the number of installations are not limited to specific embodiments. A threshold value for determining the validity of the laser signal reflected back by the corresponding object may be stored in a memory (not shown) of the processor unit 2500 of the autonomous vehicle 1000, and the processor unit 2500 of the autonomous vehicle 1000 may determine a location (including a distance to the corresponding object), speed and movement direction of the corresponding object by measuring a time taken for the laser signal, which is transmitted through the lidar sensor 2330, to return by reflecting from the corresponding object.

In addition to the camera sensor 2310, the radar sensor 2320, and the lidar sensor 2330, the object detection unit 2300 may further include an ultrasonic sensor, and various types of sensors for detecting surrounding objects of the autonomous vehicle 1000 may be further included in the object detection unit 2300.

The navigation 2400 may provide navigation information. The navigation information may include at least one of set destination information, route information according to the destination, map information related to a driving route, and current location information of the autonomous vehicle 1000. As the map information related to the driving route, the navigation 2400 may provide information such as curvature information of a road, the number of lanes of the road, a size of the lane of the road and the like to the processor 2500.

The processor unit 2500 may determine an occupant position based on the occupant detection information from the occupant detection unit 2100. That is, the processor unit 2500 may determine a user's boarding position and the number of people through the ROA system disposed inside the autonomous vehicle 1000.

For example, the processor unit 2500 may determine that there is an occupant in a driver seat line when the occupant is detected in at least one position of a driver seat and a rear seat of the driver seat. The processor unit 2500 may determine that there is an occupant in a passenger seat line when the occupant is detected in at least one position of a passenger seat and a rear seat of the passenger seat. When occupants are detected in the driver seat line and the passenger seat line, the processor 2500 may determine that the occupants are present in all seats of the autonomous vehicle 1000.

The processor unit 2500 may determine a range of a collision with the forward vehicle 3000 based on the occupant position information.

For example, when there is an occupant in the driver seat line, the processor unit 2500 may determine whether an overlapping collision range between a rear area of a forward autonomous vehicle 1000 and an area corresponding to the driver seat line in front of the autonomous vehicle 1000 is equal to or smaller than a preset value. The processor unit 2500 may determine whether the collision range in the driver seat line direction of the autonomous vehicle 1000 is 50% or less.

When there is an occupant in the passenger seat line, the processor unit 2500 may determine whether an overlapping collision range between a rear area of a forward autonomous vehicle 1000 and an area corresponding to the passenger seat line in front of the autonomous vehicle 1000 is equal to or smaller than a preset value. The processor unit 2500 may determine whether the collision range in the passenger seat line direction of the autonomous vehicle 1000 is 50% or less.

When there are occupants in all seats of the autonomous vehicle 1000, the processor unit 2500 may determine whether an overlapping collision range between a rear area of a forward autonomous vehicle 1000 and an entire front area of the autonomous vehicle 1000 is equal to or smaller than a preset value. The processor unit 2500 may determine whether the collision range in the driver or passenger seat line direction of the autonomous vehicle 1000 is 50% or less.

In addition, the processor unit 2500 may determine whether the overlapping collision range in a direction opposite to the direction in which the occupant is located is equal to or smaller than a preset value.

The processor unit 2500 may control a forward collision avoidance device sensitivity step based on a rear-end collision range of the forward vehicle 3000. The forward collision avoidance device sensitivity step may be set to five steps.

For example, in the case of a first autonomous driving sensitivity step, the processor unit 2500 may set an estimated braking collision time (TTC) of the forward vehicle 3000 to 1.2 seconds. In the case of a second autonomous driving sensitivity step, the processor 2500 may set the estimated braking collision time (TTC) of the forward vehicle 3000 to 1.5 seconds. In the case of a third autonomous driving sensitivity step, the processor unit 2500 may set the estimated braking collision time (TTC) of the forward vehicle 3000 to 1.8 seconds. In the case of a fourth autonomous driving sensitivity step, the processor unit 2500 may set the estimated braking collision time (TTC) of the forward vehicle 3000 to 2.1 seconds. In the case of a fifth autonomous driving sensitivity step, the processor unit 2500 may set the estimated braking collision time (TTC) of the forward vehicle 3000 to 2.4 seconds.

The processor unit 2500 may set the third step of the forward collision avoidance device sensitivity step as a default setting.

When the collision range of the autonomous vehicle 1000 is less than or equal to a preset value, the processor unit 2500 may raise the forward collision avoidance device sensitivity step o by one step.

In addition, the processor unit 2500 may maintain a forward collision avoidance device sensitivity step when the overlapping collision range in the direction opposite to the occupant located direction is equal to or smaller than a preset value.

The processor unit 2500 may control to avoid a collision with the forward vehicle 3000 based on the forward collision avoidance device sensitivity. That is, the processor unit 2500 may control to avoid a collision with the forward vehicle 3000 based on the raised front collision avoidance device sensitivity.

For example, in case of the third step of the forward collision avoidance device sensitivity step of the current autonomous vehicle 1000, when the collision range of the autonomous vehicle 1000 is equal to or smaller than a preset value, the processor unit 2500 sets the forward collision avoidance device sensitivity step to the fourth step by raising the forward collision avoidance device sensitivity step by one step, thereby controlling to avoid the collision with the forward vehicle 3000.

When the collision range is completely avoided according to the collision avoidance control with the forward vehicle 3000, the processor unit 2500 may change to a preset forward collision avoidance device sensitivity.

Figure 5:
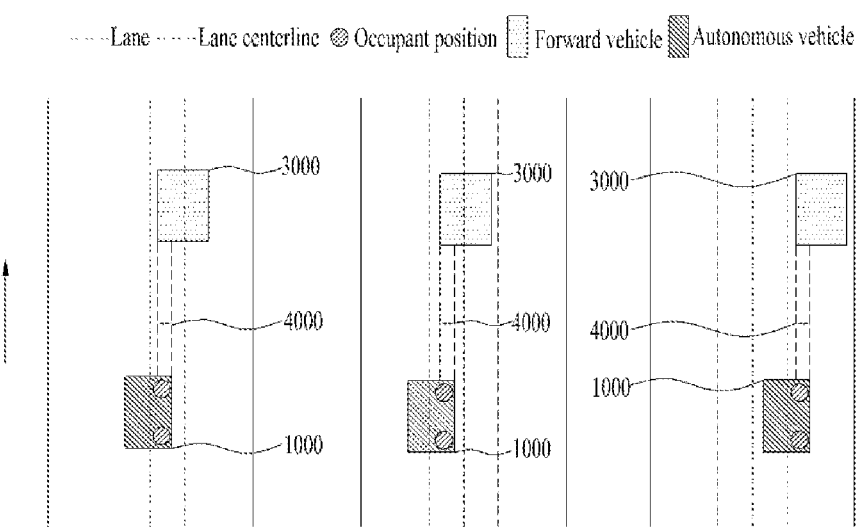
FIGS. 5 to 7 are diagrams to describe a collision avoidance situation based on an occupant position in an autonomous vehicle according to embodiments of the present disclosure.
Figure 6:
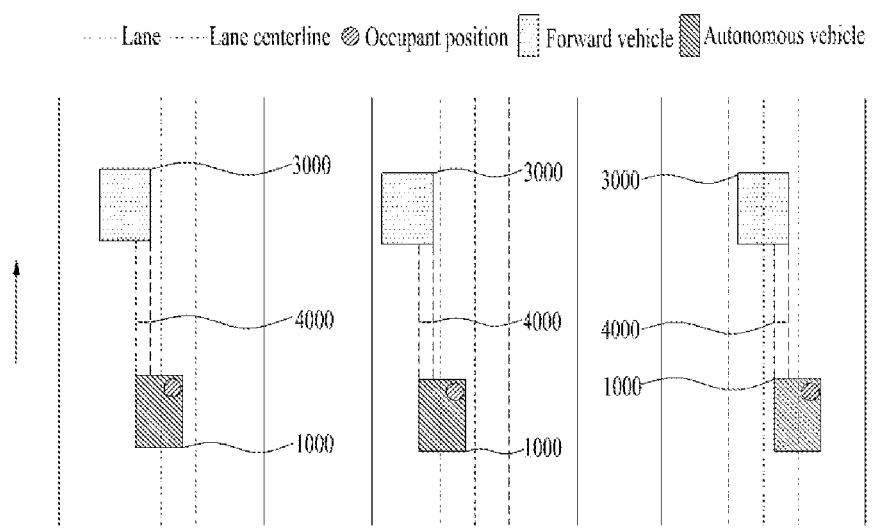
Figure 7:
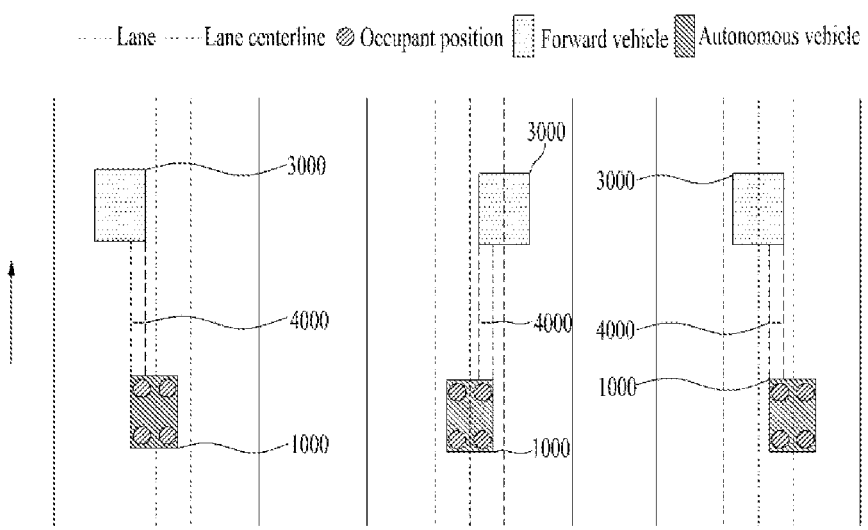

FIGS. 5 to 7 are diagrams to describe a collision avoidance situation based on an occupant position in the autonomous vehicle 1000 according to embodiments of the present disclosure.

Referring to FIG. 5, it is a case in which persons are seated in a passenger seat line as occupants are seated in a passenger seat of the autonomous vehicle 1000 and a rear seat of the passenger seat, respectively. The autonomous vehicle 1000 may determine a collision range 4000 with a forward vehicle 3000.

When the collision range 4000 is lowered to 50% or less, the autonomous vehicle 1000 may set the forward collision avoidance device sensitivity step to be raised by one step from a driver setting value.

As the collision range 4000 between the autonomous vehicle 1000 and the forward vehicle 3000 narrows, the impact is greater on the collision range 4000, so if an occupant is in a passenger seat line, a lot of damage will occur only on the right side of the autonomous vehicle 1000. Therefore, in order to prevent serious damage from being caused to the people in the passenger seat line, accidents may be prevented in advance by raising the forward collision avoidance device sensitivity step.

Referring to FIG. 6, it is a case in which a person is seated in a driver seat line as an occupant is seated in a driver seat of the autonomous vehicle 1000. The autonomous vehicle 1000 may determine a collision range 4000 with a forward vehicle 3000.

When the collision range 4000 is lowered to 50% or less, the autonomous vehicle 1000 may set the forward collision avoidance device sensitivity step to be raised by one step from a driver setting value.

As the collision range 4000 between the autonomous vehicle 1000 and the forward vehicle 3000 narrows, the impact is greater on the corresponding collision range 4000, so if an occupant is in a driver seat line, a lot of damage will occur only on the left side of the autonomous vehicle 1000. Therefore, in order to prevent serious damage from being caused to the people in the driver seat line, accidents may be prevented in advance by raising the forward collision avoidance device sensitivity step.

Referring to FIG. 7, it is a case in which persons are seated on all seats of an autonomous vehicle 1000. The autonomous vehicle 1000 may determine a collision range 4000 with a forward vehicle 3000.

When the collision range 4000 is lowered to 50% or less, the autonomous vehicle 1000 may set the forward collision avoidance device sensitivity step to be raised by one step from a driver setting value.

As the occupants are present at all seats of the autonomous vehicle 1000, in order to prevent serious damage from being caused to the persons in the vehicle, accidents can be prevented in advance by raising the forward collision avoidance device sensitivity step by considering both a collision range of the vehicle's left area and a collision range of the vehicle's right area.

Figure 8:
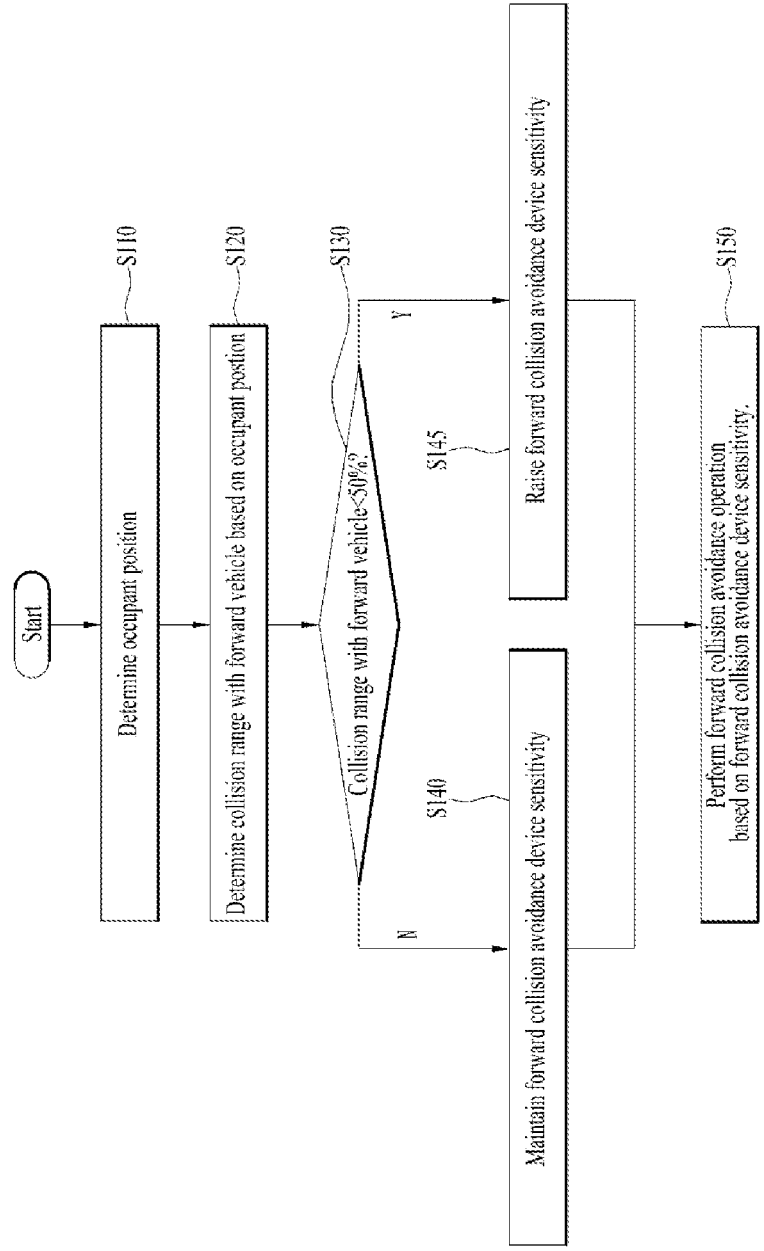
FIG. 8 is an overall flowchart of a collision avoiding method based on an autonomous vehicle occupant position in an autonomous vehicle according to one embodiment of the present disclosure.

FIG. 8 is an overall flowchart of a collision avoiding method based on an autonomous vehicle occupant position in an autonomous vehicle 1000 according to one embodiment of the present disclosure.

Referring to FIG. 8, the autonomous vehicle 1000 according to one embodiment of the present disclosure may determine an occupant position based on occupant detection information received from the occupant detection unit 2100 [S110].

After the step S110, the autonomous vehicle 1000 may determine a collision range with a forward vehicle 3000 based on an occupant position [S120].

After the step S120, the autonomous vehicle 1000 may determine whether the collision range with the forward vehicle 3000 is 50% or less [S130].

After the step S130, if the collision range 1000 exceeds 50%, the autonomous vehicle 1000 may maintain a forward collision avoidance device sensitivity step [S140].

After the step S140, if the collision range is 50% or less, the autonomous vehicle 1000 may raise the forward collision avoidance device sensitivity step [S145].

After the step S140 or the step S145, if the collision range is 50% or less, the autonomous vehicle 1000 may perform a forward collision avoidance operation based on a forward collision avoidance sensitivity. In this case, if the collision range exceeds 50%, the autonomous vehicle 1000 performs the forward collision avoidance operation based on the maintained forward collision avoidance device sensitivity step. If the collision range is 50% or less, the autonomous vehicle 1000 may perform the forward collision avoidance operation based on the raised forward collision avoidance device sensitivity step [S150].

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of avoiding a collision based on an occupant position in a vehicle, the method comprising:
   determining the occupant position based on occupant detection information, wherein the determining the occupant position further comprises:
      determining that an occupant is in a driver seat line based on detecting the occupant from at least one position of a driver seat or a rear seat of the driver seat; and
      determining that the occupant is in a passenger seat line based on detecting the occupant from at least one position of a forward passenger seat or a rear passenger seat;
   determining a collision range with an other vehicle based on occupant position information, wherein the determining the collision range comprises:
      determining whether a first overlapping collision range between a rear area of the other vehicle and an area corresponding to the driver seat line in front of the vehicle, based on the occupant being in the driver seat line, is less than or equal to a first preset value; and
      determining whether a second overlapping collision range between the rear area of the other vehicle and an area corresponding to the passenger seat line in the front of the vehicle, based on the occupant being in the driver seat line, is less than or equal to a second preset value;
   controlling a collision avoidance sensitivity increment based on a rear-end collision range with the other vehicle; and
   activating a collision avoidance operation to avoid the collision with the other vehicle based on the collision avoidance sensitivity increment.

2. The method of claim 1, wherein the determining the occupant position comprises:
   receiving the occupant detection information including a user's boarding position and a number of people received from a Rear Occupant Alert (ROA) system provided in the vehicle.

3. The method of claim 2, wherein the determining the occupant position further comprises:
   determining that occupants are on all seats of the vehicle based on detecting occupants on the driver seat line and the passenger seat line.

4. The method of claim 3, wherein the determining the collision range further comprises:
   determining whether a third overlapping collision range between the rear area of the other vehicle and an entire front area of the autonomous-vehicle, based on the occupants in the driver seat line and the passenger seat line of the autonomous-vehicle, is less than or equal to a third preset value.

5. The method of claim 4, wherein the controlling the collision avoidance sensitivity increment comprises:
   increasing the collision avoidance sensitivity increment based on one of the first overlapping collision range, the second overlapping collision range, and the third overlapping collision range being equal to or less than the respective first preset value, second preset value, and third preset value.

6. The method of claim 5, wherein the collision avoidance operation comprises avoiding the collision with the other vehicle based on a value of the collision avoidance sensitivity increment.

7. The method of claim 6, further comprising changing the value of the collision avoidance sensitivity increment to a preset collision avoidance sensitivity increment value based on completely avoiding the collision range according to the collision avoidance operation with the other vehicle.

8. The method of claim 5, wherein the determining the collision range further comprises:
determining whether a fourth overlapping collision range in a direction opposite to a direction having the occupant located therein is equal to or less than a fourth preset value.

9. The method of claim 8, wherein the controlling the collision avoidance sensitivity increment further comprises:
maintaining the collision avoidance sensitivity increment based on a determination that the fourth overlapping collision range is less than or equal to the fourth preset value.

10. An apparatus for avoiding a collision based on an occupant position, the apparatus comprising:
an occupant detection unit detecting a presence or non-presence of an occupant in a vehicle;
an object detection unit detecting an other vehicle; and
a processor unit configured to:
determine the occupant position based on occupant detection information based on the presence of the occupant, wherein the determining the occupant position comprises:
based on detecting the occupant from at least one position of a driver seat or a passenger seat behind the driver seat, determining that the occupant is in a driver seat line; and
based on detecting the occupant from at least one position of a forward passenger seat or a rear passenger seat, determining that the occupant is in a passenger seat line;
determine a collision range with the other vehicle based on occupant position information, wherein the determining the collision range comprises:
based on the occupant being in the driver seat line, determining whether a first overlapping collision range between the rear area of the other vehicle and an area corresponding to the driver seat line in front of the vehicle is equal to or less than a first preset value; and
based on the occupant being in the passenger seat line, determining whether a second overlapping collision range between the rear area of the other vehicle and an area corresponding to the passenger seat line in front of the vehicle of the forward passenger seat is equal to or less than a second preset value;
set a collision avoidance sensitivity value based on a vehicle rear-end collision range with the other vehicle; and
activate a collision avoidance operation to avoid the collision with the other vehicle based on the collision avoidance sensitivity value.

11. The apparatus of claim 10, wherein the occupant detection unit comprises a rear occupant alert (ROA) system, and
wherein the processor unit is configured to receive the occupant detection information including a user's boarding position and a number of people determined by the ROA system.

12. The apparatus of claim 11, wherein,
based on detecting occupants from the driver seat line and the passenger seat line, the processor unit is further configured to determine that the occupants are on all seats of the vehicle.

13. The apparatus of claim 12,
wherein, based on the occupants being in the driver seat line and the passenger seat line of the vehicle, the processor unit is further configured to determine whether a third overlapping collision range between the rear area of the other vehicle and an entire front area of the vehicle is equal to or less than a third preset value.

14. The apparatus of claim 13, wherein, based on the one of the first overlapping collision range, the second overlapping collision range, and the third overlapping collision range being equal to or less than one of the first preset value, second preset value, and third preset value, the processor unit is configured to increase the collision avoidance sensitivity value.

15. The apparatus of claim 14, wherein the processor unit is configured to activate a collision avoidance control with the other vehicle based on the collision avoidance sensitivity value being increased.

16. The apparatus of claim 15, wherein the processor unit is configured to change the collision avoidance sensitivity value to a preset sensitivity value based on completely avoiding the collision range according to the collision avoidance operation with the other vehicle.

17. The apparatus of claim 14, wherein the processor unit is configured to determine whether a fourth overlapping collision range in a direction opposite to a direction having the occupant located therein is equal to or less than a fourth preset value.

18. The apparatus of claim 17, wherein the processor unit is configured to maintain the collision avoidance sensitivity value based on the fourth overlapping collision range being equal to or less than the fourth preset value.

19. An autonomous vehicle, comprising:
at least one sensor detecting an occupant of a vehicle;
at least one senor detecting a surrounding object; and
a collision avoidance device configured to:
determine an occupant position based on occupant detection information based on a presence of the occupant, wherein the determining the occupant position further comprises:
determining that the occupant is in a driver seat line based on detecting the occupant from at least one position of a driver seat or a rear seat of the driver seat; and
determining that the occupant is in a passenger seat line based on detecting the occupant from at least one position of a forward passenger seat or a rear passenger seat;
determine a collision range with a forward vehicle based on occupant position information, wherein the determining the collision range comprises:
determining whether a first overlapping collision range between a rear area of the other vehicle and an area corresponding to the driver seat line in front of the vehicle, based on the occupant being in the driver seat line, is less than or equal to a first preset value; and
determining whether a second overlapping collision range between the rear area of the other vehicle and an area corresponding to the passenger seat line in the front of the vehicle, based on the occupant being in the driver seat line, is less than or equal to a second preset value;
adjust a collision avoidance sensitivity increment based on a rear-end collision range with an other vehicle; and initiate a collision avoidance operation to avoid the collision with the other vehicle based on the collision avoidance sensitivity increment.

\* \* \* \* \*